(12) United States Patent
Reichert et al.

(10) Patent No.: US 9,106,059 B2
(45) Date of Patent: Aug. 11, 2015

(54) ELECTRIC POWER DISTRIBUTOR FOR CONNECTING FIRST AND SECOND MULTIPHASE AIRCRAFT GENERATOR POWER LINES HAVING SINGLE-PHASE CABLES

(75) Inventors: Thomas Reichert, Osnabrueck (DE); Detlef Tiegs, Bremen (DE); Merten Helms, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 170 days.

(21) Appl. No.: 13/808,958

(22) PCT Filed: Jul. 5, 2011

(86) PCT No.: PCT/EP2011/061323
§ 371 (c)(1),
(2), (4) Date: Mar. 25, 2013

(87) PCT Pub. No.: WO2012/004266
PCT Pub. Date: Jan. 12, 2012

(65) Prior Publication Data
US 2013/0196520 A1   Aug. 1, 2013

Related U.S. Application Data

(60) Provisional application No. 61/362,495, filed on Jul. 8, 2010.

(30) Foreign Application Priority Data

Jul. 8, 2010  (DE) .................... 10 2010 031 086

(51) Int. Cl.
*H01R 13/44* (2006.01)
*H02B 1/20* (2006.01)
(Continued)

(52) U.S. Cl.
CPC ............... *H02B 1/20* (2013.01); *F02M 51/005* (2013.01); *H01R 11/09* (2013.01); *H01R 31/02* (2013.01);
(Continued)

(58) Field of Classification Search
CPC .... F02M 51/005; F02M 69/465; F02P 7/021; F02D 41/3005; B29C 45/14065
USPC .......................................... 439/130, 258, 580
See application file for complete search history.

(56) References Cited

U.S. PATENT DOCUMENTS 2,411,861 A    12/1946 Antony, Jr. et al.
2,581,208 A *  1/1952 Schmidt, Jr. .................. 310/219
(Continued)

FOREIGN PATENT DOCUMENTS

DE    7716465    11/1977
DE    4338705    5/1994
(Continued)

OTHER PUBLICATIONS

German Search Report, Jul. 8, 2010.

*Primary Examiner* — Chandrika Prasad
(74) *Attorney, Agent, or Firm* — Greer, Burns & Crain Ltd.

(57) ABSTRACT

A distributor for connecting at least a first multiphase line to at least a second multiphase line, comprising a plurality of contacting points, wherein each of the contacting points is arranged to electrically connect a phase of the first line to a corresponding phase of the second line, the plurality of contacting points being arranged approximately on a circular line.

12 Claims, 6 Drawing Sheets

(51) Int. Cl.
*F02M 51/00* (2006.01)
*H01R 11/09* (2006.01)
*H01R 31/02* (2006.01)
*H02G 3/16* (2006.01)
*H01R 4/34* (2006.01)
*H01R 107/00* (2006.01)

(52) U.S. Cl.
CPC .............. *H02G 3/16* (2013.01); *B64D 2221/00* (2013.01); *H01R 4/34* (2013.01); *H01R 2107/00* (2013.01); *H01R 2201/26* (2013.01)

(56) References Cited

U.S. PATENT DOCUMENTS

| | | | | |
|---|---|---|---|---|
| 2,752,409 A | * | 6/1956 | Eaton | 373/103 |
| 3,888,559 A | * | 6/1975 | Geib | 439/258 |
| 4,166,664 A | * | 9/1979 | Herrmann, Jr. | 439/258 |
| 4,759,729 A | * | 7/1988 | Kemppainen et al. | 439/580 |
| 5,154,622 A | * | 10/1992 | Ehrentraut et al. | 439/130 |
| 5,197,903 A | | 3/1993 | Casey et al. | |
| 5,238,415 A | * | 8/1993 | Bittner et al. | 439/130 |
| 2011/0117773 A1 | | 5/2011 | Delmas | |

FOREIGN PATENT DOCUMENTS

| | | |
|---|---|---|
| DE | 29509987 | 10/1995 |
| FR | 1138663 | 6/1957 |
| FR | 1188797 | 9/1959 |
| FR | 2877774 | 5/2006 |
| GB | 1350605 | 4/1974 |
| GB | 1438103 | 6/1976 |
| JP | 2009118575 | 5/2009 |

\* cited by examiner

ELECTRIC POWER DISTRIBUTOR FOR CONNECTING FIRST AND SECOND MULTIPHASE AIRCRAFT GENERATOR POWER LINES HAVING SINGLE-PHASE CABLES

CROSS REFERENCE TO RELATED APPLICATIONS

This application claims benefit of U.S. provisional application No. 61/362,495, filed Jul. 8, 2010 and German patent application No. 10 2010 031 086.7, filed Jul. 8, 2010, the entire disclosures of which are herein incorporated by reference.

FIELD OF THE INVENTION

The present invention relates to a distributor for connecting at least a first multiphase line to at least a second multiphase line, to a distributor arrangement and to an aircraft or space craft.

BACKGROUND OF THE INVENTION

Although the present invention and the problem on which it is based can be applied in particular to any aircraft or spacecraft, they will be described in detail with regard to an aircraft.

Figure 1:
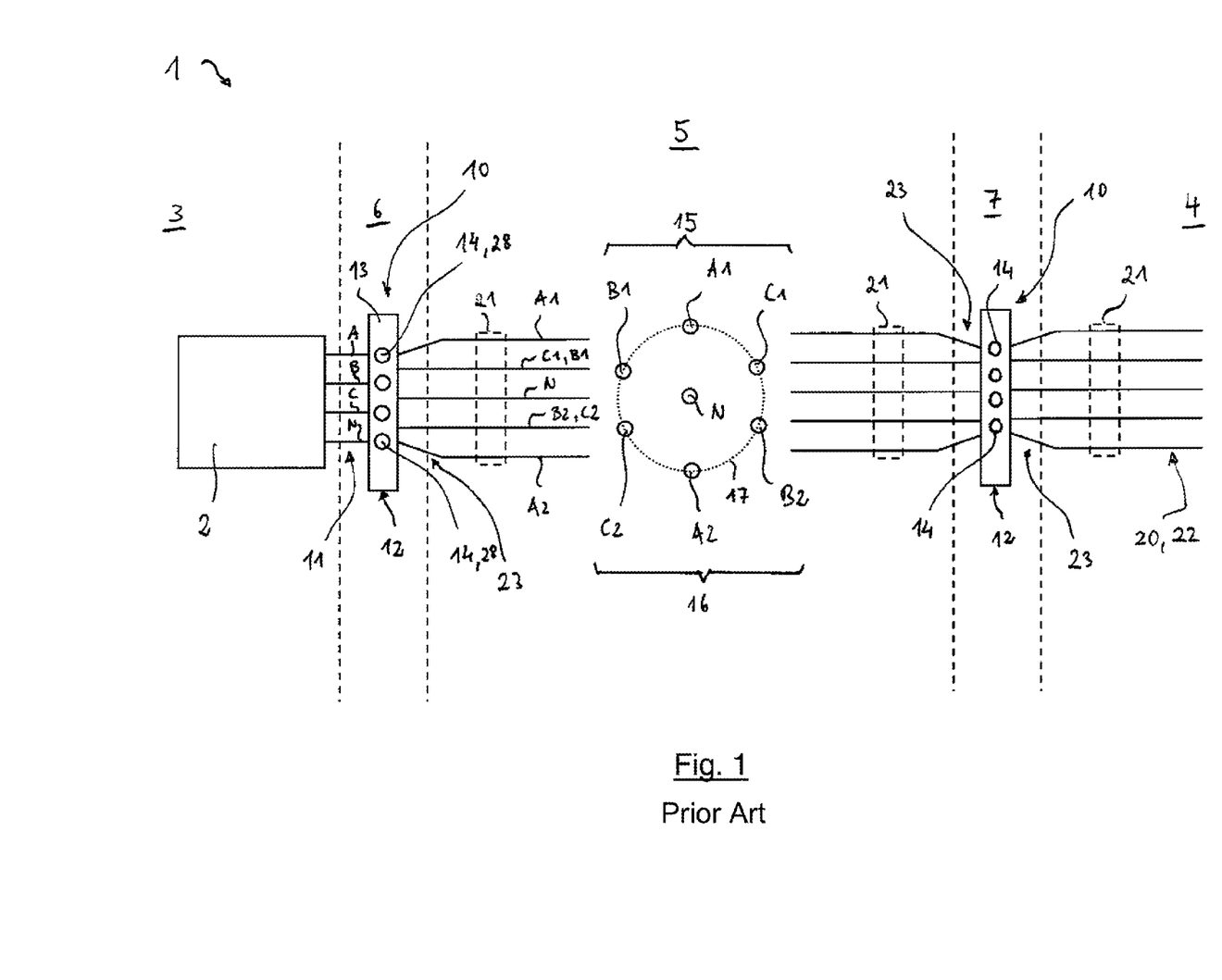
FIG. 1 schematically shows a detail of a generally known aircraft.

FIG. 1 schematically shows a detail of an aircraft 1 which is generally known. The aircraft 1 has a generator 2 which is accommodated in an engine pod 3. The generator 2 is driven by the turbine (not shown) of the engine (not shown) which is arranged in the engine pod 3 to generate electric current. In order to supply consumers (not shown) in the fuselage 4 of the aircraft 1 with electric current, the current has to be conducted from the engine pod 3 through a wing 5 into the fuselage 4.

Due to the fact that, nowadays, the various aircraft components are produced in different locations and are subsequently assembled on one another, predefined connection areas are provided between the various components. Thus, for example in the present case, such a connection area 6 is provided between the engine pod 3 and the wing 5 and a further such connection area 7 is provided between the wing 5 and the fuselage 4.

This presents the problem that the generator 2 cannot be connected to the consumers inside the fuselage 4 of the aircraft 1 by means of a single continuous line. It is, however, necessary to provide a plurality of lines which are provided such that they can be interconnected in the region of connection points 6 and 7.

For example, the generator 2 has a line 11 which consists of three phases A, B and C as well as a neutral phase N and connects the generator 2 to the distributor 12.

The distributor 12 has a substantially planar plate 13 on which a plurality of bolts 14 are arranged. The bolts 14 extend substantially parallel to one another. Each of the phases A, B, C and N is pushed onto an associated bolt 14 by a cable lug.

Running in the wing 5 are two lines 15 and 16, a broken-away cross section thereof being shown schematically. Line 15 consists of three phases A1, B1 and C1 and line 16 consists of three phases A2, B2 and C2. A neutral phase N is also provided which is associated equally with the two lines 15 and 16. For electromagnetic reasons, in particular to prevent line losses, the phases A1, B1, C1, A2, B2, C2 (hereafter denoted as A1 to C2) seen in cross section are arranged on an imaginary circular line 17 at approximately uniform distances from one another, specifically such that the phases A1 and A2, B1 and B2 and C1 and C2 are always diagonally opposite one another. The phases are held in their respective position by so-called "bobbins" 21. The use of two lines 15 and 16 instead of only one line is advantageous in that consequently, the respective phases can be configured with a relatively small diameter.

Each of the phases A1 to C2 also has a cable lug by which they can each be pushed onto one of the bolts 14. A cable lug of one of the phases A, B, C and N of line 11 is always braced against a cable lug of one of the phases A1 to C2 and N of lines 15 and 16 by means of a nut (not shown) so that a conductive contact—a corresponding contacting point is denoted by reference numeral 28 in FIG. 1—is produced between the two cable lugs. The connection of a plurality of cable lugs by means of a bolt is known, for example from document W 2009/131831.

Thus, for example, phase A of line 11 is electrically connected to phase A1 of line 15. The corresponding contacting points 28 which electrically interconnect phases A, B, C and N of line 11 with phases A1 to C2 and N of lines 15 and 16 are positioned next to one another inside a plane.

Based on the conception of the generator 2 and the line 11, it is necessary in the present case to electrically connect phase A to both phase A1 and phase A2, phase B to phases B1 and B2 and phase C to phases C1 and C2. For this purpose, three cable lugs can accordingly also be provided on one bolt 14. In this respect, however, other configurations are also very common. For example, line 11 can also have seven phases A1, B1, C1, A2, B2, C2 and N which connect the generator 2 to the distributor 12. A corresponding configuration is provided at the connection area 7, where the distributor 12 connects the seven phases of lines 15 and 16 to seven phases of lines 20, 22.

The solution described above is disadvantageous in that phases A1 to C2 have to be transferred from their substantially annular arrangement, preset by the bobbins 21, into a substantially planar arrangement, preset by the distributor 12 with the corresponding bolts 14 in a transition region 23 associated with the connection areas 6 and 7. To complicate matters, phases A1 to C2 must not have any contact with one another and the correct phases must always be connected together, i.e. phase A to phase A1 etc. This results in a generally difficult and time-consuming assembly when electrically connecting line 11 to lines 15 and 16 as well as lines 15 and 16 to the corresponding lines 20, 22 in the fuselage 4 of the aircraft 1.

SUMMARY OF THE INVENTION

Therefore, it is an aspect of the present invention to provide a possibility of facilitating the connection described above of multiphase lines, particularly in the case of an aircraft or spacecraft.

According to the invention, this object is achieved by a distributor which has the features of claim 1, by a distributor arrangement which has the features of claim 9 and by an aircraft or spacecraft which has the features of claim 10.

Accordingly, a distributor is provided for connecting at least a first multiphase line to at least a second multiphase line. The distributor has a plurality of contacting points, each contacting point being arranged to electrically connect a phase of the first line to a corresponding phase of the second line, the plurality of contacting points being arranged approximately on a circular line.

A distributor arrangement is also provided which comprises at least a first multiphase line, at least a second multiphase line and the distributor according to the invention, each of the contacting points electrically connecting a phase of the first line to a corresponding phase of the second line.

Furthermore, an aircraft or spacecraft is provided which comprises a first component, a second component and the distributor arrangement according to the invention, the first multiphase line running in the first component and the second multiphase line running in the second component.

The idea on which the present invention is based is that the plurality of contacting points is to be arranged approximately on a circular line. This means that the lines or the phases thereof retain their circular arrangement even in the region of connection points between two components, for example between an engine pod and a wing. Consequently, it is no longer necessary to perform the transfer, difficult in terms of assembly, of the phases from their circular arrangement described at the outset into the planar arrangement also described at the outset.

Advantageous configurations and improvements of the invention are provided in the subclaims.

A direct contacting or an indirect contacting of the phase of the first line with the corresponding phase of the second line can be provided at the contacting points. The term "direct" means that the phases rest directly against one another. "Indirect" means that the phases are electrically interconnected by inserted means, for example by an electrically conductive bolt.

According to a preferred development of the distributor according to the invention, the plurality of contacting points each has a bolt. Consequently, the phase and the corresponding phase can simply be contacted by corresponding cable lugs and, if appropriate, by a nut which can be screwed onto the bolt.

According to a further preferred development of the distributor according to the invention, the bolts are arranged approximately in a star shape. This produces in a simple manner the desired arrangement of the plurality of contacting points on the circular line.

According to a further preferred development of the distributor according to the invention, at least two connection elements are provided which support the bolts on their respective ends, said connection elements being arranged in a crossed manner relative to one another. A connection element can support the bolts provided on its ends such that they are insulated from one another or can support them such that they are electrically interconnected. The expression "in a crossed manner" means that the connection elements are arranged at an angle to one another. The connection elements can form an angle of, for example, 30, 45, 60 or 90° to one another.

According to a further preferred development of the distributor according to the invention, arranged along an axis substantially vertically to the plane in which the circular line is located, upstream and downstream of the plane is a respective further contacting point for connecting a neutral phase of the first multiphase line to a neutral phase of the second multiphase line, the contacting points being electrically interconnected. Consequently, the neutral phases can simply be attached in the region of the centre of the circular line and connected together.

According to a further preferred development of the distributor according to the invention, at least two of the plurality of contacting points are insulated from one another. This is advantageous in respect of an overload recognition, which will be discussed in more detail later on. More preferably, the at least two contacting points are approximately opposite one another. This is advantageous from an electromagnetic point of view, in particular to prevent line loss.

According to a further preferred development, at least two of the plurality of contacting points are electrically interconnected. This development is particularly advantageous if for example only four phases are available from the generator, but which are to be connected to seven phases which lead, for example, to consumers in the aircraft fuselage. In this case as well, the at least two contacting points are preferably approximately opposite one another.

According to a further preferred development of the distributor according to the invention, an insulating element is arranged along an axis substantially vertically to the plane in which the circular line is located, between contacting points which are electrically interconnected in each case. As a result, phases A, B and C can be provided such that they are simply electrically insulated from one another.

BRIEF DESCRIPTION OF THE DRAWINGS

In the following, the invention will be described in more detail on the basis of embodiments with reference to the accompanying figures of the drawings, in which.

DETAILED DESCRIPTION OF THE PREFERRED EMBODIMENTS

In the figures, the same reference numerals denote identical or functionally identical components, unless indicated otherwise.

Figure 2:
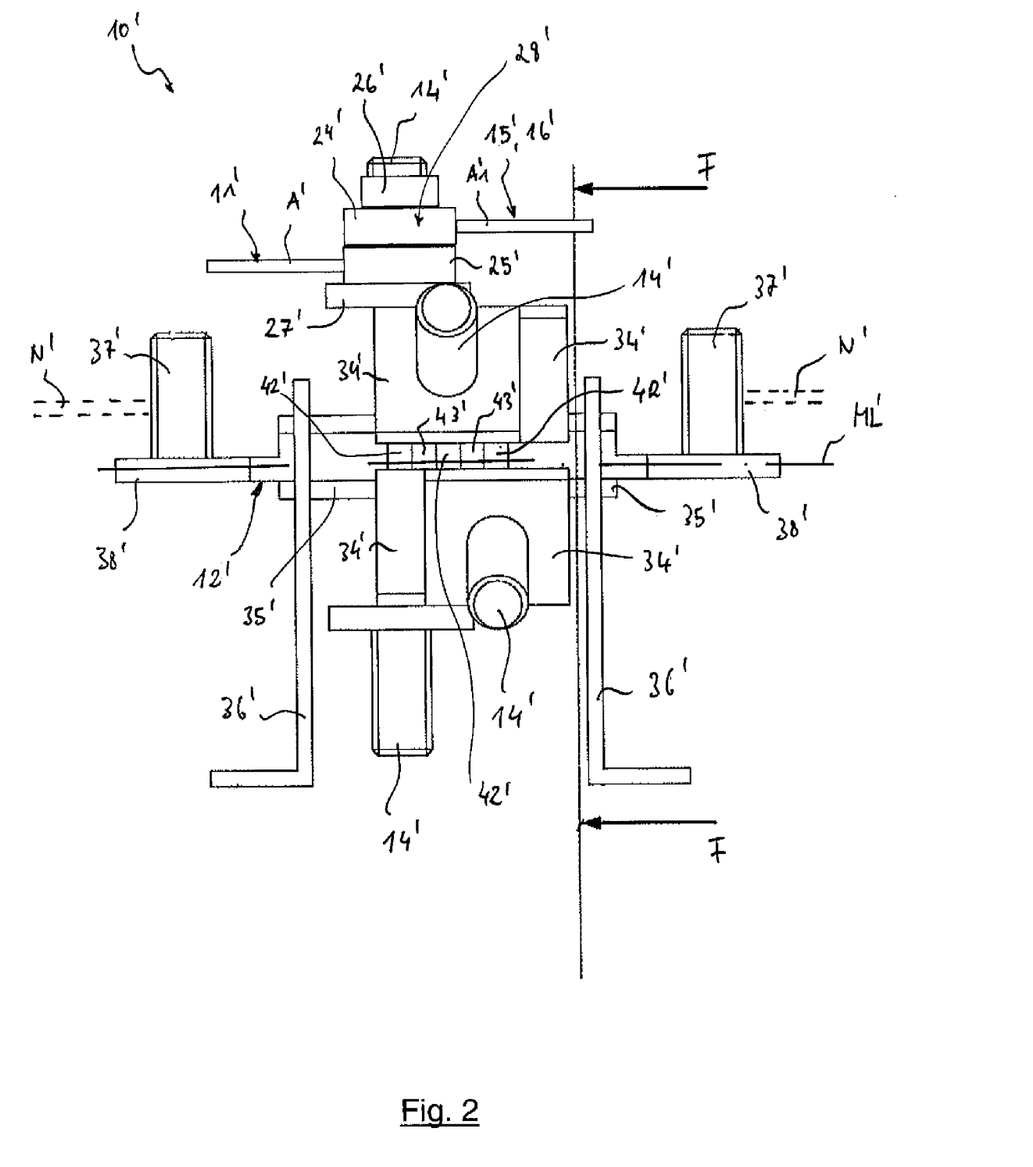
FIG. 2 is a side view of a distributor arrangement according to an embodiment of the present invention.
Figure 3:
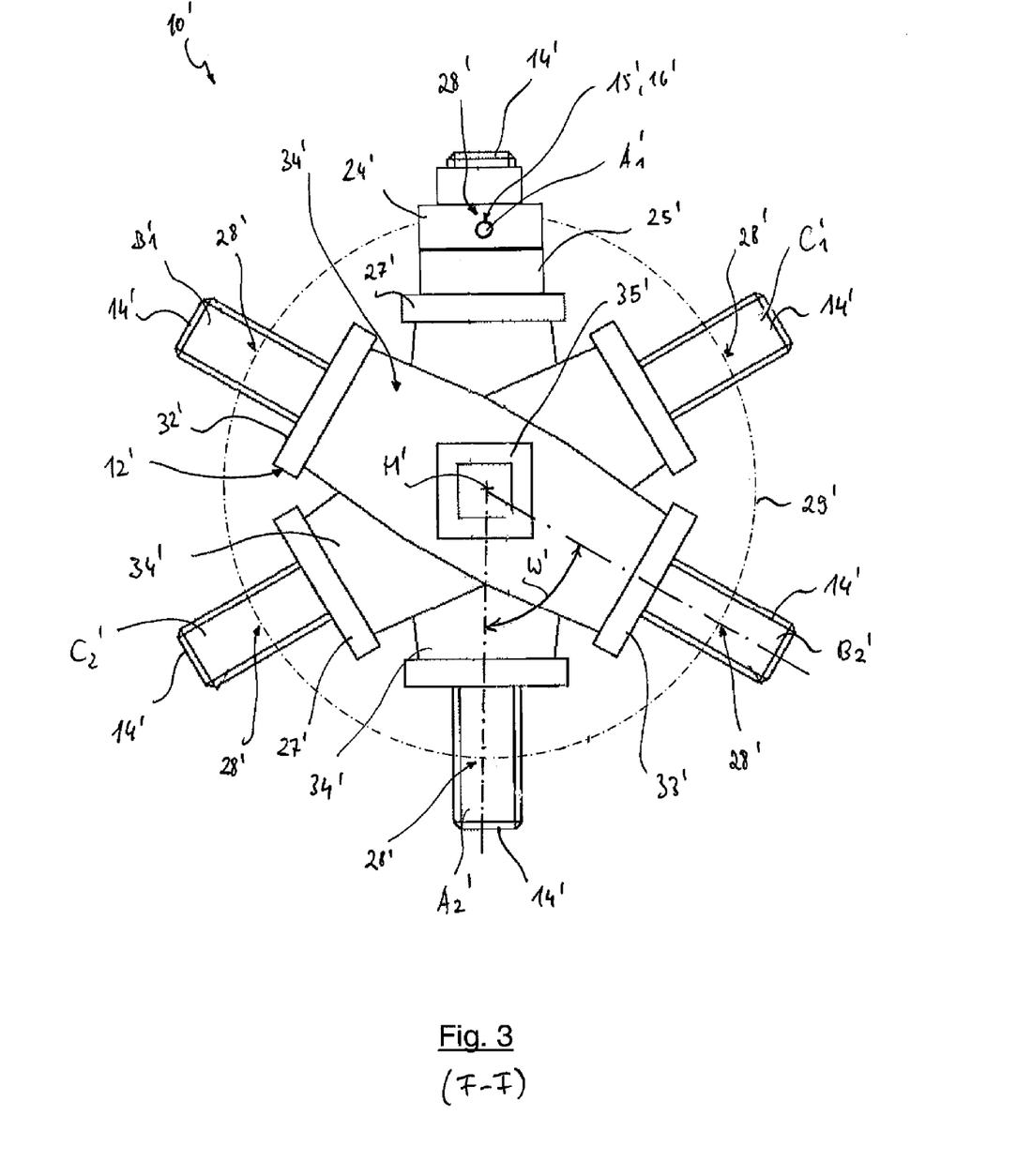
FIG. 3 shows a section F-F from FIG. 2.

FIG. 2 is a side view of a distributor arrangement 10' according to an embodiment of the present invention and FIG. 3 shows a section F-F from FIG. 2.

Figure 4:
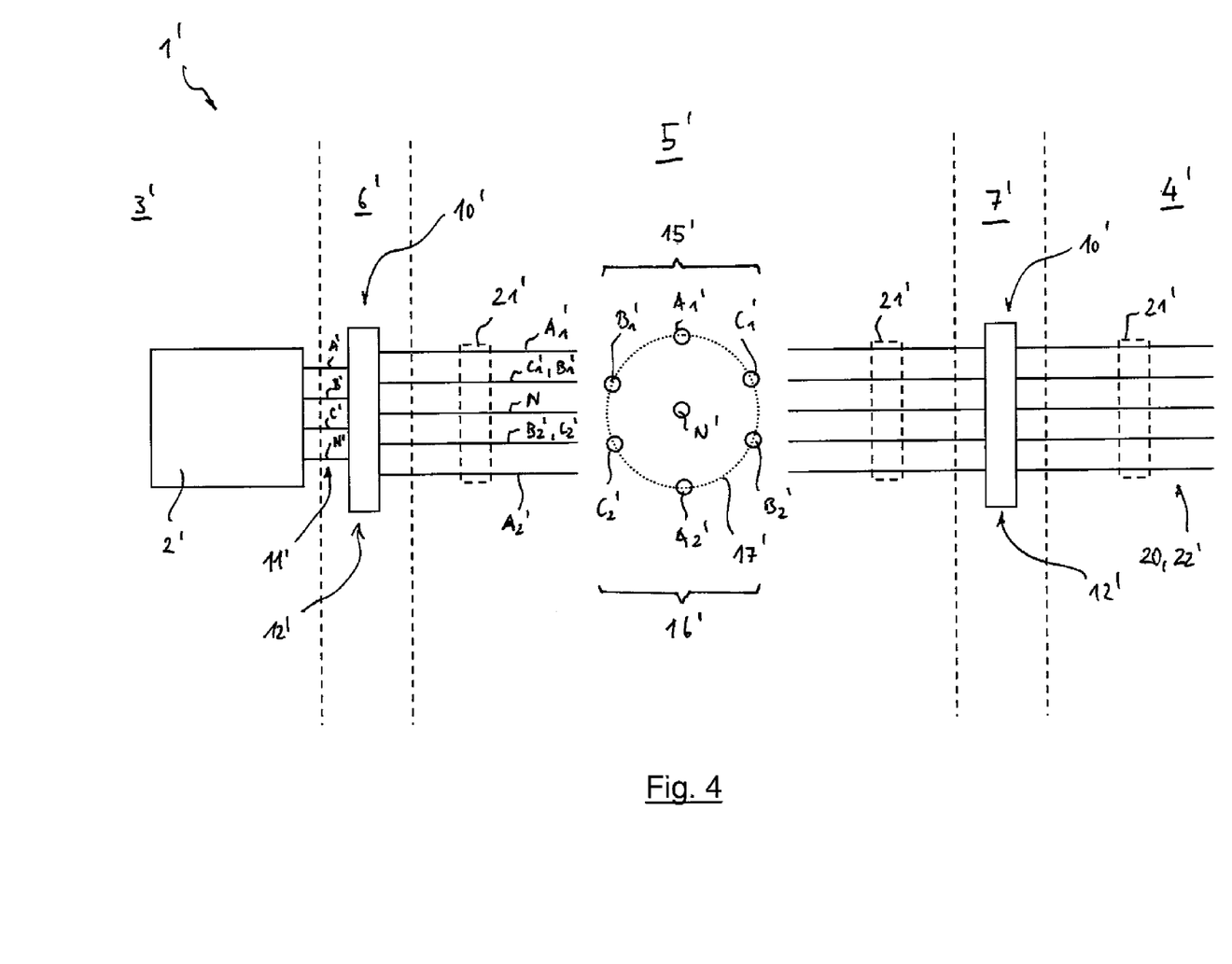
FIG. 4. schematically shows a detail of an aircraft according to an embodiment of the present invention.

The aircraft 1' has two distributor arrangements 10', see FIG. 4, which electrically connect the generator 2' to the consumers (not shown), for example in the fuselage 4' of the aircraft 1'.

Each of the distributor arrangements 10' has a distributor 12', see FIG. 4. The distributor 12' connects a first multiphase line 11' with phases A', B', C' and N' to two second multiphase lines 15' and 16' with phases A1', B1', C1', A2', B2', C2' and N'. Purely by way of example, in FIG. 2, a phase A' is shown from the first line 11' and a phase A1' is shown from the second line 15'.

In the present context, the term "phase" is understood as being synonymous with "cable". The letters "A", "B" and "C" refer to the fact that the phases conduct alternating current, the maximum amplitudes of which are in different phase positions to one another. Thus, the phases "A1" and "B1" have different phase positions and the phases "A1" and "A2" have the same phase positions. The allocation of phases A1, B1 and C1 to a first line 15 and of phases A2, B2 and C2

Phases A' and A1' have on their ends a respective cable lug 24' and 25'. The cable lugs 24' and 25' are pushed onto a bolt 14' of the distributor 12' by an opening in the cable lugs 24' and 25' and are braced against a contact surface 27' by a nut 26'. This produces an electrically conducting contact between the cable lugs 24' and 25'. Furthermore, the bolt 14' itself can be formed from an electrically conductive material, thereby further improving the electrical line between the cable lugs 24' and 25'. Thus, an electrical contacting point is produced between phase A' and phase A1' which is generally denoted by 28'.

As can clearly be seen from FIG. 3, the distributor 12' according to the present embodiment has six such contacting points 28' which are arranged on a circular line 29'. The circular line 29' can be identical to a circular line 17', see FIG. 4, on which phases A1' to C2' of the second lines 15' and 16' are arranged.

Six bolts 14' for example are arranged in the shape of a star for the purpose of the circular arrangement of the contacting points 28'. Furthermore, two bolts 14' are always arranged at opposite ends 32' and 33' of a connection element 34'. Mutually corresponding phases of the first and second lines 15' and 16' are preferably attached to the bolts 14' of a respective connection element 34'. Thus, for example, a bolt 14' of one of the connection elements 34' supports phase A1' of the one second line 15', while the other bolt 14' of the same connection element 34' supports the corresponding phase A2' of the other second line 16'. Phases B1' to C1' behave in a corresponding manner in FIG. 3.

As can also be seen in FIG. 3, the connection elements 34' are arranged in a crossed manner. This means that in each case two connection elements 34' together form an angle W'. According to the present embodiment, the angle W' is 60°, but can also be any different angle as desired, for example an angle of 30, 45 or 90°.

FIG. 3 also shows that all the connection elements 34' intersect one another approximately in a central point M'. The central point M' coincides with the central point of the circular line 29'.

Returning now to FIG. 2, this shows a centre line ML' which runs through the central point M'. The centre line ML' is substantially vertical to the plane in which the circular line 29' is located.

The connection elements 34' together with the corresponding bolts 14' are arranged in tandem, in a crossed manner as described, on the centre line ML'. The connection elements 34' can be directly attached to one another in the region of the centre line ML'. Alternatively, the connection elements 34' can be mounted on an axle which penetrates each of them, for example a rectangular tube.

According to the present embodiment, retaining portions 35' are provided on the respectively externally arranged connection elements 34'—on the left and right hand sides in FIG. 2. The retaining portions 35' can be configured, for example as rectangular tubes and can also form the axle described above which penetrates the connection elements 34'. The retaining portions 35' extend substantially along the centre line ML' and connect the connection elements 34' to fasteners 36', by which the distributor 12' can be attached in the aircraft 1', for example at an attachment site in the region of connection areas 6', 7', see FIG. 4.

A further bolt 37' is also preferably arranged in each case upstream and downstream of the connection elements 34'. The bolts 37' are electrically interconnected by retaining portions 38' which preferably extend along the centre line ML'. The bolts 37' form electric contacting points for connecting a neutral phase N' of the first line 11' to a neutral phase N' of the second lines 15' and 16'.

The retaining portions 35' are formed from an insulating material and they insulate the retaining portions 38' against the fasteners 36' and, if appropriate, against the connection elements 34', if the latter are configured to be conductive, as described later on.

Depending on whether four phases A', B', C' N', for example coming from the generator 2' (see FIG. 4), are to be connected to seven phases A1' to C2' and N' for example leading to consumers in the fuselage 4', or whether seven phases, for example coming from the generator 2', are to be connected to seven phases A1' to C2' and N', for example leading to the consumers in the fuselage 4', two different configurations of the distributor 12' are envisaged.

In the first case, i.e. four to seven phases, the bolts 14' of a respective connection element 34', see FIG. 2, are electrically interconnected, in that a respective connection element 34' is provided to be electrically conductive. For example, for this purpose the connection elements 34' can be formed from metal. The connection elements 34' or portions 42' thereof are in turn insulated from one another by means of insulating elements 43'. The portions 42' and the insulating elements 43' can alternate along the centre line ML', as shown in FIG. 2.

In the second case, i.e. seven to seven phases, the bolts 14' are provided to be electrically insulated from one another, i.e. the connection elements 34' are formed from insulating material. This is advantageous in respect of an early overload detection. Failure of one of the phases A1' to C2' can be established by a simple measurement, for example, of the current intensity in a respective phase A1' to C2'. This is more difficult in the first case described above, due to the electrical connection between in each case two bolts 14' of a connection element 34'.

The configurations described above for the first and second cases can be combined together. Thus, for example, phase A1' could be electrically connected to phase A2' and phase B1' could be electrically insulated from phase B2'.

FIG. 4 shows a detail of an aircraft 1' according to an embodiment of the present invention.

In the case of the aircraft 1', the distributors 12 described in FIG. 1 are each replaced by the distributors 12' described in connection with FIGS. 2 and 3. Accordingly, the transition region 23 which is still present in FIG. 1 and is difficult to provide in terms of assembly is no longer required. For the rest, the arrangement of FIG. 4 corresponds to that of FIG. 1.

Figure 5:
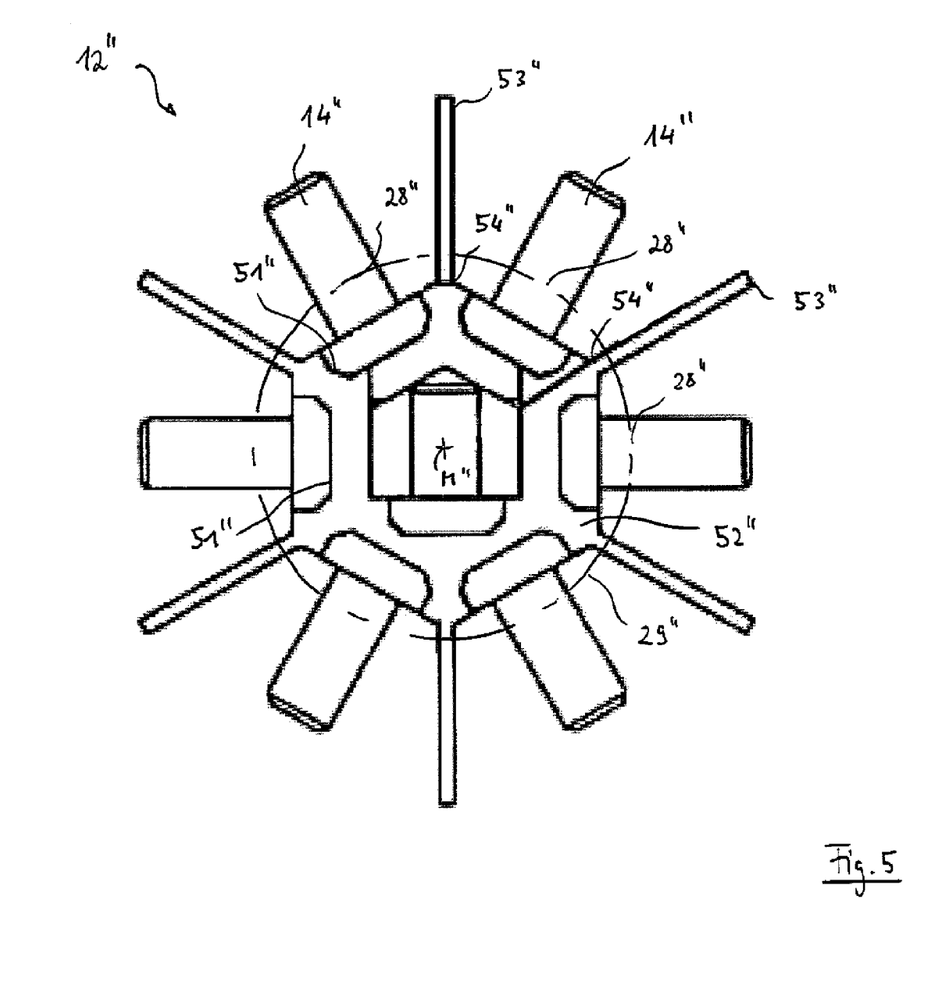
FIG. 5 is a side view of a distributor according to a further embodiment of the present invention.
Figure 6:
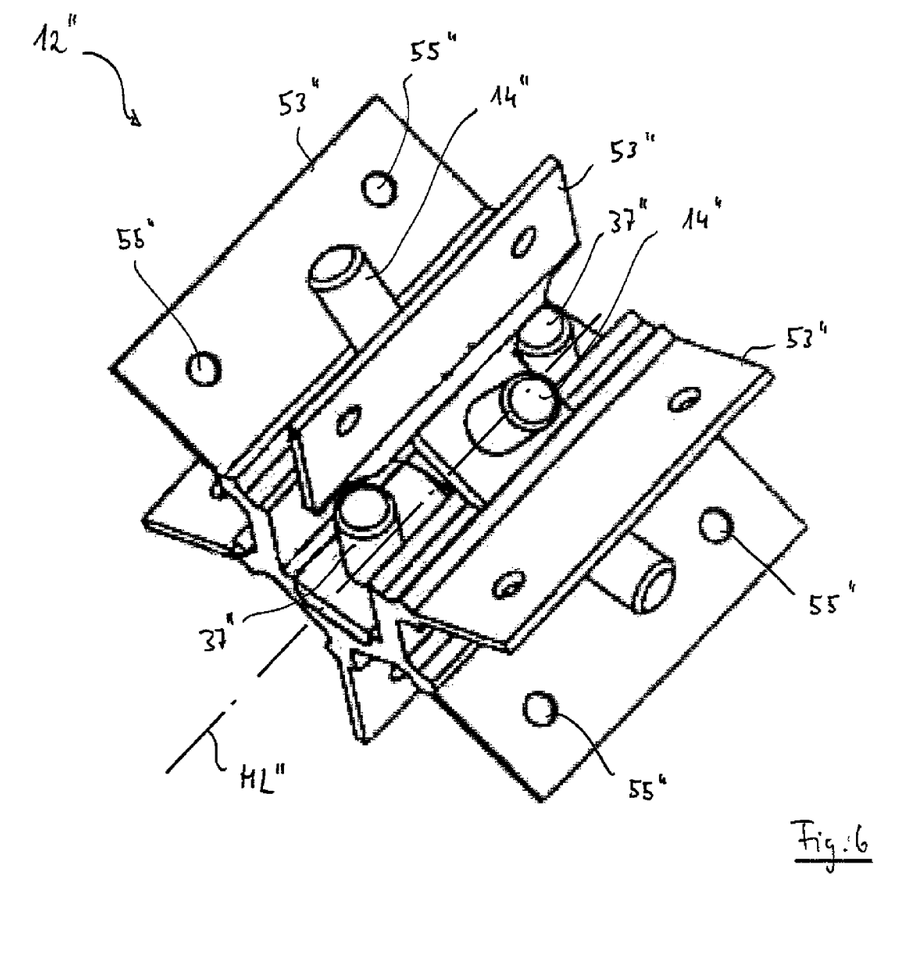
FIG. 6 is a perspective view of the distributor from FIG. 5.

FIG. 5 is a side view of a distributor 12" according to a further embodiment of the present invention and FIG. 6 is a perspective view of the distributor 12" of FIG. 5.

In the following, only the differences compared to the embodiment according to FIGS. 2 and 3 will be discussed.

In the distributor 12" shown in FIGS. 5 and 6, the six bolts 14" are secured having been introduced into recesses 51" in, for example, a hexagonal supporting body 52". Other forms of attachment are naturally also possible. The supporting body 52" is formed from an insulating material, for example plastics material, in order to electrically insulate the bolts 14' from one another. Consequently, the distributor 10" is well suited to a connection of seven to seven phases, as described for the second case in connection with FIGS. 2 and 3.

The distributor 12" can also comprise separating elements 53" which shield the bolts 14" and the phases A1' to C2' from one another, see FIG. 5, to thus prevent a spark-over in particular. The separating elements 53" can be configured, for example, as rectangular plates which each extend away radially from corner points 54" of the hexagonal supporting body 52", see FIG. 5.

The separating elements 53" can have one or more holes 55" for attaching the distributor 12" to a housing or to a structure of the aircraft 1.

Unlike the distributor 12' according to FIGS. 2 and 3, in the case of the distributor 12" according to FIGS. 5 and 6, the bolts 14" are arranged in a plane. Offset upstream and downstream of this plane, along the centre line ML" are the further bolts 37" for forming the further contacting points for a connection of the neutral conductors N' of the first and second lines 15', 16', see FIG. 2.

The distributor 12" can be built in the aircraft 1', as described in connection with FIG. 4 for the distributor 12'.

Although the invention has been described here on the basis of preferred embodiments, it is not restricted thereto, but can be modified in many different ways. In particular, the developments and embodiments described for the distributor according to the invention can be applied accordingly to the distributor arrangement and to the aircraft and spacecraft according to the invention, and vice versa. Furthermore, "one" as used herein does not exclude a plurality.

The invention claimed is:

1. An electric power distributor for connecting at least a first multiphase aircraft generator power line consisting of single-phase cables in a substantially annular arrangement to at least a second multiphase aircraft generator power line consisting of single-phase cables in a substantially annular arrangement, comprising a plurality of contacting points wherein each of the contacting points is arranged to electrically connect a single-phase cable of the first line to a corresponding single-phase cable of the second line, the plurality of contacting points being arranged approximately on a circular line, wherein arranged offset upstream and downstream of the contacting points along an axis substantially perpendicular to the plane in which the circular line is located is a respective further contacting point for connecting a neutral-phase cable of the first multiphase line to a neutral phase cable of the second multiphase line, the further contacting points being electrically interconnected.

2. The distributor of claim 1, wherein the plurality of contacting points each has a bolt.

3. The distributor of claim 2, wherein the bolts are arranged approximately in a star shape.

4. The distributor of claim 2, wherein at least two connection elements are provided which support the bolts at their respective ends, the connection elements being arranged in a crossed manner relative to one another.

5. The distributor of claim 1, wherein at least two of the plurality of contacting points are insulated from one another or approximately opposite one another.

6. The distributor of claim 1, wherein at least two of the plurality of contacting points are insulated from one another and approximately opposite one another.

7. The distributor of claim 1, wherein at least two of the plurality of contacting points are electrically interconnected or are approximately opposite one another.

8. The distributor of claim 7, wherein an insulating element is arranged along an axis substantially perpendicular to a plane in which the circular line is located, between in each case two contacting points which are electrically interconnected.

9. The distributor of claim 1, wherein at least two of the plurality of contacting points are electrically interconnected and are approximately opposite one another.

10. The distributor of claim 9, wherein an insulating element is arranged along an axis substantially perpendicular to a plane in which the circular line is located, between in each case two contacting points which are electrically interconnected.

11. An electric power distributor arrangement, comprising:
at least a first multiphase aircraft generator power line consisting of single-phase cables in a substantially annular arrangement;
at least a second multiphase aircraft generator power line consisting of single-phase cables in a substantially annular arrangement; and
an electric power distributor for connecting at least the first multiphase line to at least the second multiphase line, comprising a plurality of contacting points wherein each of the contacting points is arranged to electrically connect a single-phase cable of the first line to a corresponding single-phase cable of the second line, the plurality of contacting points being arranged approximately on a circular line, wherein arranged offset upstream and downstream of the contacting points along an axis substantially perpendicular to the plane in which the circular line is located is a respective further contacting point for connecting a neutral-phase cable of the first multiphase line to a neutral-phase cable of the second multiphase line, the further contacting points being electrically interconnected, wherein each of the contacting points electrically connects a single-phase cable of the first line to a corresponding single-phase cable of the second line.

12. An aircraft or spacecraft, comprising:
a first component;
a second component; and
an electric power distributor arrangement comprising:
at least a first multiphase aircraft generator power line consisting of single-phase cables in a substantially annular arrangement;
at least a second multiphase aircraft generator power line consisting of single-phase cables in a substantially annular arrangement; and
an electric power distributor for connecting at least the first multiphase line to at least the second multiphase line, comprising a plurality of contacting points wherein each of the contacting points is arranged to electrically connect a single-phase cable of the first line to a corresponding single-phase cable of the second line, the plurality of contacting points being arranged approximately on a circular line, wherein arranged offset upstream and downstream of the contacting points along an axis substantially perpendicular to the plane in which the circular line is located is a respective further contacting point for connecting a neutral phase of the first multiphase line to a neutral phase of the second multiphase line, the further contacting points being electrically interconnected, wherein each of the contacting points electrically connects a single-phase cable of the first line to a corresponding single-phase cable of the second line,
wherein the first multiphase line runs in the first component and the second multiphase line runs in the second component.

* * * * *